UNITED STATES PATENT OFFICE.

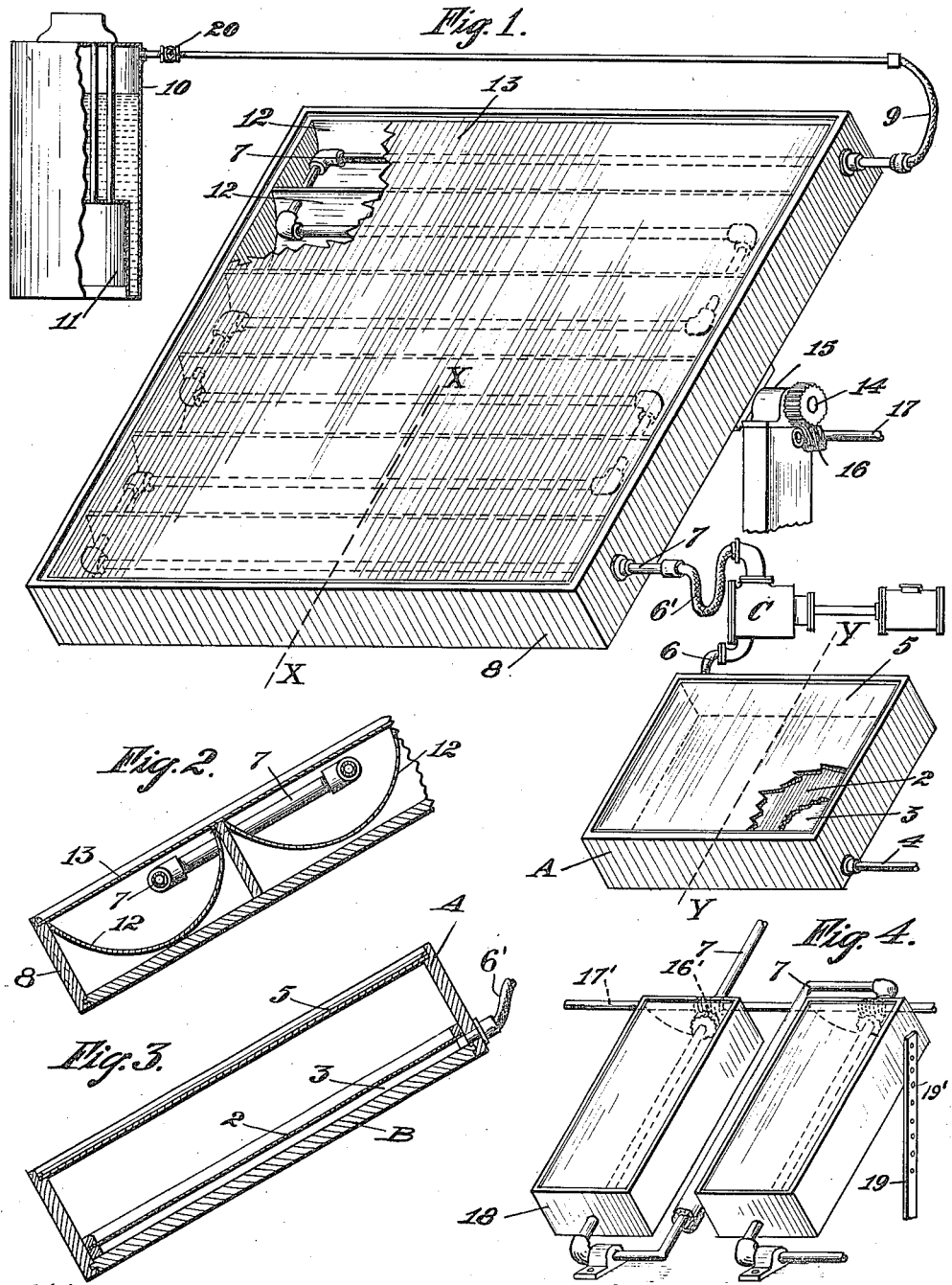

THOMAS F. NICHOLS, OF RAY, ARIZONA TERRITORY.

SOLAR HEATER.

1,014,972.  Specification of Letters Patent.  Patented Jan. 16, 1912.

Application filed June 28, 1911. Serial No. 635,831.

*To all whom it may concern:*

Be it known that I, THOMAS F. NICHOLS, citizen of the United States, residing at Ray, in the county of Pinal and Territory of Arizona, have invented new and useful Improvements in Solar Heaters, of which the following is a specification.

This invention relates to a system for utilizing solar energy, and particularly pertains to an apparatus for raising the temperature of water or other liquids in a series of steps by means of the sun's rays, so as to generate or aid in the generation of steam for power purposes.

It is the object of this invention to provide an apparatus of the above character, which is simple in construction and operation, and which can be installed at small cost.

A further object is to provide a solar heater which is especially adapted for use in hot, arid countries as a means for generating steam for operating various machinery, and which is particularly adapted to be used in conjunction with ordinary steam boilers to assist in the generation of steam, and, when sufficiently hot, to permit of the boiler fires being extinguished altogether, thus economizing fuel costs.

A further object is to provide a solar heater having a high degree of efficiency, and which is capable of adjustment so that it will bear a constant relative position to the sun as the latter varies its position during its travel across the heavens.

The invention consists of the parts and the construction and combination of parts, as hereinafter more fully described and claimed, having reference to the accompanying drawings, in which—

Figure 1 is a perspective view of the invention. Fig. 2 is a cross section on line X—X Fig. 1. Fig. 3 is a cross section on line Y—Y Fig. 1. Fig. 4 is a perspective view showing a modified form of the invention.

In the drawings A represents the outer walls of a preliminary heating tank, which is here shown as having a wooden bottom B, above which is disposed a thin metal plate 2, spaced a short distance from the bottom B to form a shallow water-tight space 3 therebeneath, which space is connected to a water supply pipe 4, through which water is delivered to the space 3 beneath the plate 2 in any suitable manner and from any desired source. The upper end of the tank A is tightly sealed with a plate of glass 5, which is disposed some distance from the metallic plate 2 to form a dead-air space within the tank A between the glass plate 5 and the metallic plate 2. The tank A is preferably disposed at an incline so that the sun's rays will be directed upon the plate 2 nearly perpendicular thereto.

Leading from one upper corner of the space 3 in the tank A is a pipe 6, which leads to the feed opening of a force pump C, the discharge opening of which connects with a flexible tubing 6', leading to and connecting with a generating pipe 7. The generating pipe 7 enters a rectangular, rocking frame 8 and passes backward and forward therein in parallel sections, finally passing out of the frame 8 near its upper end and terminating in a flexible tube 9. This tube 9 may lead to any desired point of discharge, but is here shown as connected to the steam space of a boiler 10, which boiler is here shown as that of the ordinary fire tube type arranged over the usual fire-box 11.

Within the frame 8 is a series of parabolic mirrors 12, which are disposed beneath the long, parallel sections of the generating pipe 7, and are designed to collect the sun's rays and focus them upon the several long sections of the generating pipe 7. The upper portion of the frame 8 is covered with a glass plate 13 so as to form dead-air chambers between the glass plate 13 and the mirrors 12 in which the generating pipe 7 is inclosed. The mirrors 12 are preferably disposed with their longitudinal axes extending east and west, and the frame 8 is mounted on a rocking-shaft 14 supported in suitable bearings 15, which shaft is designed to be rotated by means of a worm gear 16 on a driving shaft 17 from any suitable source of power; the speed and direction of rotation of the shaft 17 being such as to maintain the mirrors in such relation to the sun that the rays of the latter reflecting from the mirrors 12 at different hours of the day will be focused upon the pipe 7.

If desired, the parabolic mirrors 12 may be mounted separately, as shown in Fig. 4, and extending north and south. In this instance they are mounted in a rocking frame 18 with the pipe 7 acting as an axis, and are rotated on the generating pipe 7 from east to west by means of worm gears 16' meshing with the gears on a driving-shaft 17'.

The longitudinal inclination of the mirrors 12 shown in Fig. 4 is adjusted by means of a perforated standard 19; pin 19' passing through the perforations in the latter and engaging the frame 18 in any suitable manner.

In operation water is admitted to the space 3 through the pipe 4, and is drawn off through the pipe 6' by means of the force pump C, which pump forces the water through the generating pipe 7 at a pressure equal to that of the back pressure of the steam in the boiler 10. The water inclosed in the space 3 is heated by the action of the sun's rays on the plate 2, so that when it enters the generating pipe 7 it is partially warmed. The heat generated by the sun's rays being focused on the pipe 7 by the action of the series of mirrors 12 is sufficient to convert the water in the pipe 7 into steam during certain periods of the day, which steam is discharged into the boiler 10 from whence it may be drawn off and used as required.

A check valve 20 may be disposed at any suitable point in the pipe leading to the boiler 10 to prevent back-pressure from the boiler 10 to the solar heater.

It is obvious that the solar heater will operate to generate steam only during certain hours of the day and when the heat of the sun's rays is intense. At such times the fires in the fire-box 11 may be reduced or extinguished and at other times the solar heater merely acts to heat the water before it is delivered to the boiler 10.

The water being primarily heated in the tank A, is brought to a higher temperature in the generating pipe 7, and may be converted into steam in the latter; in either event the water or steam is delivered to the boiler 10 to be further employed as desired, from which it will be seen that the water is converted into steam in a series of steps.

Having thus described my invention what I claim and desire to secure by Letters Patent, is—

1. In a solar steam generator, the combination of a preliminary water heating tank adapted to be acted on by the sun's rays, means for admitting water thereto and discharging it therefrom, a generator pipe which receives the water from the preliminary heater, a series of parabolic mirrors arranged to focus the sun's rays on said generator pipe, and means for adjusting the position of the mirrors to correspond with changes of the sun's position.

2. In a solar steam generator, the combination of a preliminary water heating tank adapted to be acted on by the sun's rays and having a shallow water receiving space, said space covered with a thin metal plate, means for admitting water to said tank, means for discharging it therefrom, a generator pipe which receives the water from the preliminary heater, and a series of parabolic mirrors arranged to focus the sun's rays on said generator pipe.

3. In a solar steam generator, the combination of a preliminary water heating tank adapted to be acted on by the sun's rays and having a shallow water receiving space, said space covered with a thin metal plate, an inclosed space above said metal plate, a plate of glass covering said space, means for admitting water to said tank, means for discharging it therefrom, a generator pipe which receives the water from the preliminary heater, and a series of parabolic mirrors arranged to focus the sun's rays on said generator pipe.

4. In a solar steam generator, the combination of a preliminary water heating tank adapted to be acted upon by the sun's rays and having a shallow water receiving space, said space covered with a thin metal plate, a plate of glass disposed above said metal plate and spaced therefrom and incased to form an inclosed space above said plate, means for admitting water to the tank, means for discharging it therefrom, comprising a force pump, a generator pipe into which the heated water is discharged by the force pump, a series of parabolic mirrors arranged to focus the sun's rays on said generator pipe, and means for adjusting the position of the mirrors.

5. In a solar steam generator, the combination of a preliminary water heating tank adapted to be acted upon by the sun's rays and having a shallow water receiving space, said space covered with a thin metal plate, a plate of glass disposed above said metal plate and spaced therefrom and incased to form an inclosed space above said plate, means for admitting water to the tank, means for discharging it therefrom, comprising a force pump, a generator pipe into which the heated water is discharged by the force pump, a series of parabolic mirrors arranged to focus the sun's rays on said generator pipe, said mirrors mounted on a rocking frame and inclosed therein, said rocking frame, a plate of glass on said frame disposed above said mirrors and generator pipe forming a dead air space between said mirrors and said last named plate of glass, and means for adjusting the position of the rocking frame.

6. In a solar steam generator, the combination of a preliminary water heating tank adapted to be acted upon by the sun's rays and having a shallow water receiving space, said space covered with a thin metal plate, a plate of glass disposed above said metal plate and spaced therefrom and incased to form an inclosed space above said plate, means for admitting water to the tank, means for discharging it therefrom, comprising a force pump, a generator pipe into which the heated water is discharged by the force pump, a series of parabolic mirrors arranged to focus the sun's rays on said generator pipe, said mirrors mounted on a rocking frame and inclosed therein, said rocking frame, a plate of glass on said frame disposed above said mirrors and generator pipe forming a dead air space between said mirrors and said last named plate of glass, means for adjusting the position of the rocking frame, a steam boiler, and means connecting the generator pipe to said boiler.

In testimony whereof I have hereunto set my hand in the presence of two subscribing witnesses.

THOMAS F. NICHOLS.

Witnesses:
ROBERT E. VAN BERGEN,
E. A. THORNTON.